(12) United States Patent
Coon

(10) Patent No.: US 6,282,063 B1
(45) Date of Patent: Aug. 28, 2001

(54) FLEXURE-SLIDER BONDING SYSTEM

(75) Inventor: Warren Coon, Temecula, CA (US)

(73) Assignee: Magnecomp Corp., Temecula, CA (US)

(*) Notice: Subject to any disclaimer, the term of this patent is extended or adjusted under 35 U.S.C. 154(b) by 0 days.

(21) Appl. No.: 09/197,338

(22) Filed: Nov. 19, 1998

Related U.S. Application Data

(60) Provisional application No. 60/088,684, filed on Jun. 9, 1998.

(51) Int. Cl.[7] ............................. G11B 5/49; G11B 21/20
(52) U.S. Cl. ................................ 360/245.3; 360/234.6
(58) Field of Search ......................... 360/103, 104, 360/234.6, 245.2, 245.3

(56) References Cited

U.S. PATENT DOCUMENTS

| | | | |
|---|---|---|---|
| 5,530,606 | * 6/1996 | Baasch et al. | 360/104 |
| 5,774,305 | * 6/1998 | Boutaghou | 360/104 |
| 5,880,908 | * 3/1999 | Shiraishi et al. | 360/104 |
| 5,969,904 | * 10/1999 | Alt et al. | 360/104 |

FOREIGN PATENT DOCUMENTS

| | | | |
|---|---|---|---|
| 5-114263 | * | 5/1993 | (JP) . |
| 5-128771 | * | 5/1993 | (JP) . |
| 5-144207 | * | 6/1993 | (JP) . |
| 6-60582 | * | 3/1994 | (JP) . |
| 7-169224 | * | 7/1995 | (JP) . |

OTHER PUBLICATIONS

Hutchinson Technology "Type 16 Suspension Product Summary" pp. 1–7, Jul. 1991.*

* cited by examiner

*Primary Examiner*—David L. Ometz
(74) *Attorney, Agent, or Firm*—Louis J. Bachand

(57) ABSTRACT

Method and apparatus is provided for controlling unwanted flow of slider bonding adhesive from the flexure tongue portion to the flexure outrigger portion including roughening the tongue portion surface opposite the slider, enclosing the locus of slider attachment fully or partially with a trough etched into the tongue portion, and increasing the depth of fluid adhesive at the locus to increase the adhesive mass and improve the bonding at the slider.

10 Claims, 6 Drawing Sheets

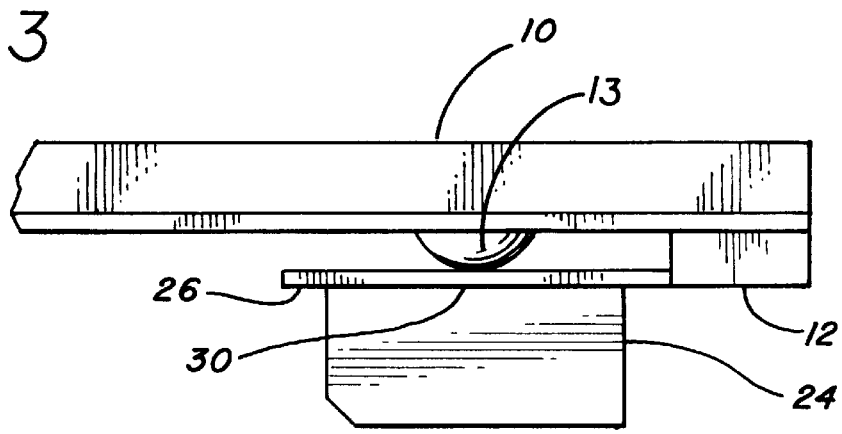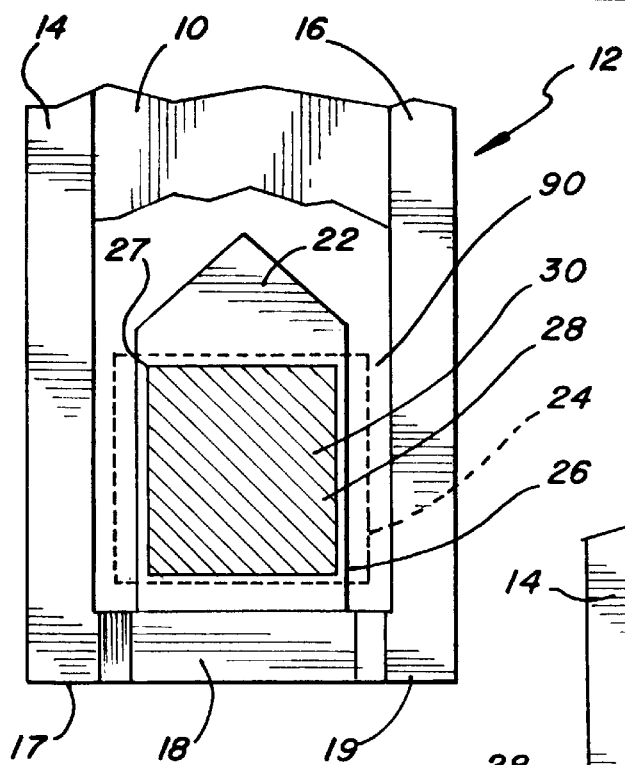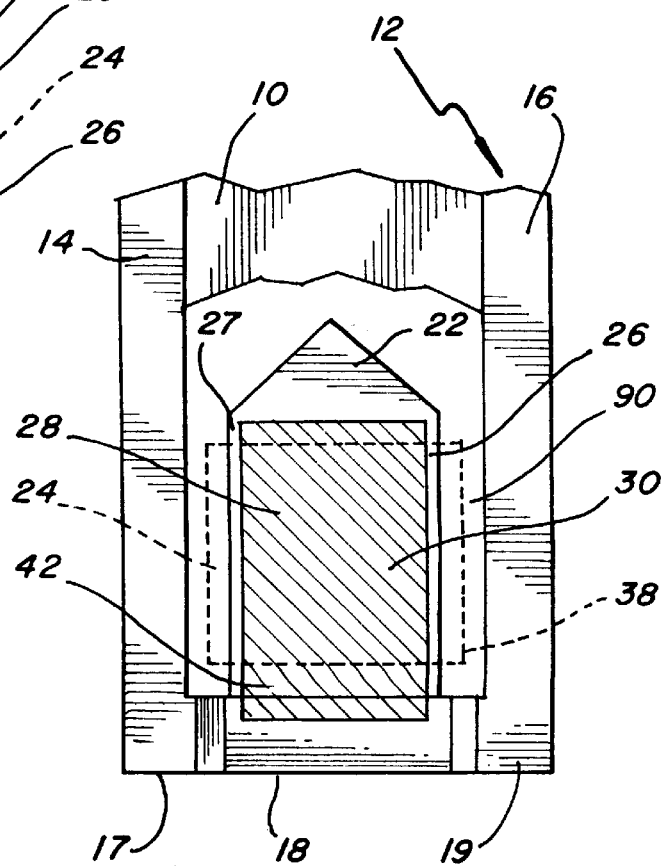

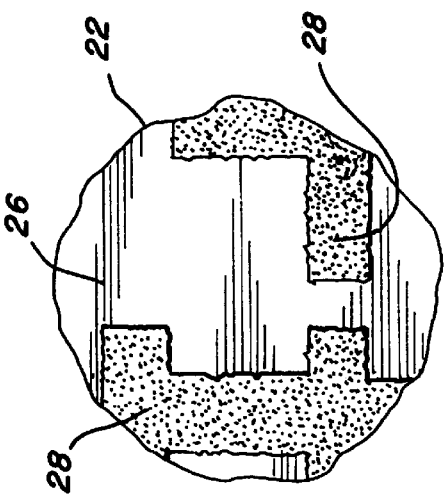
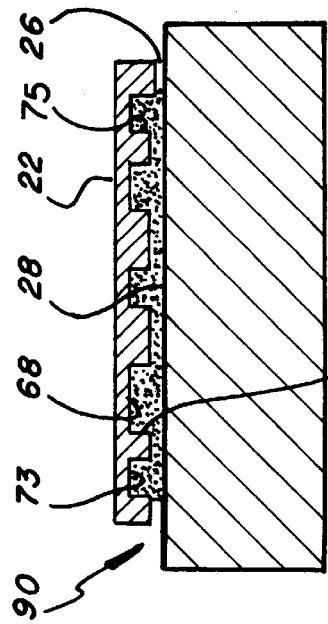
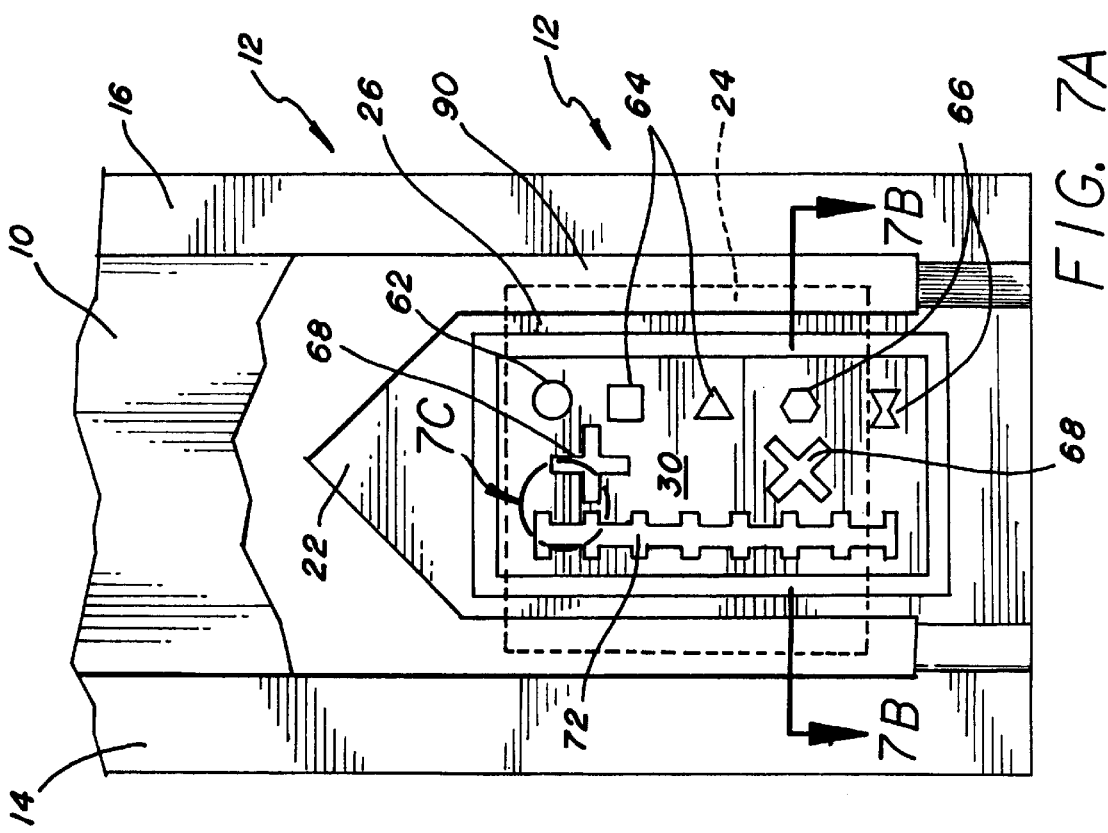

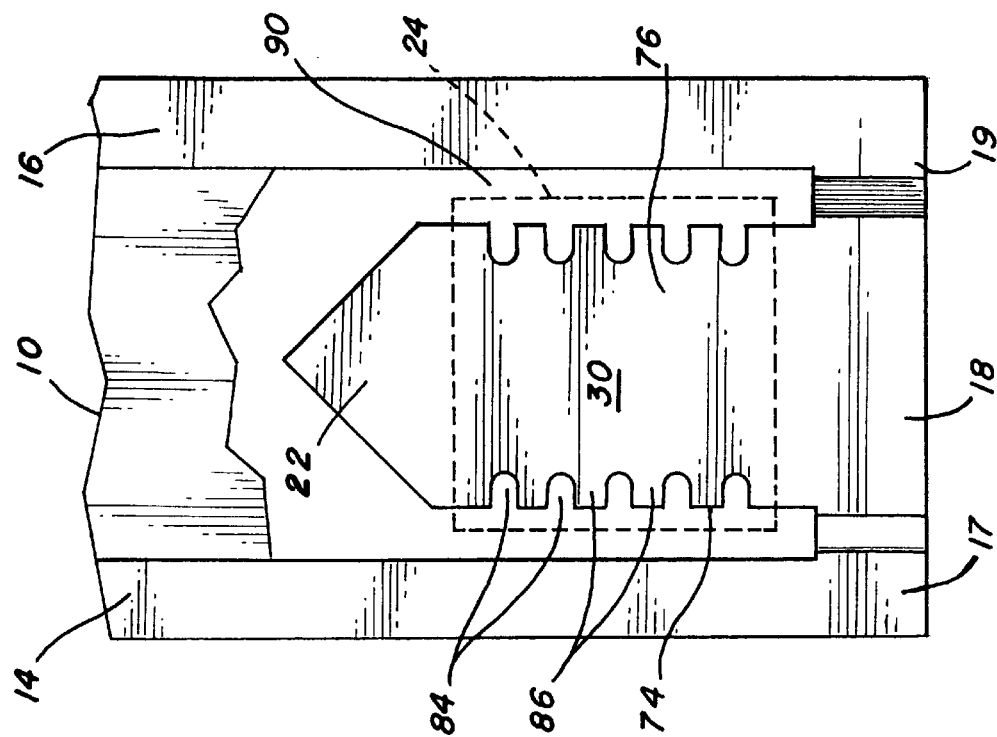
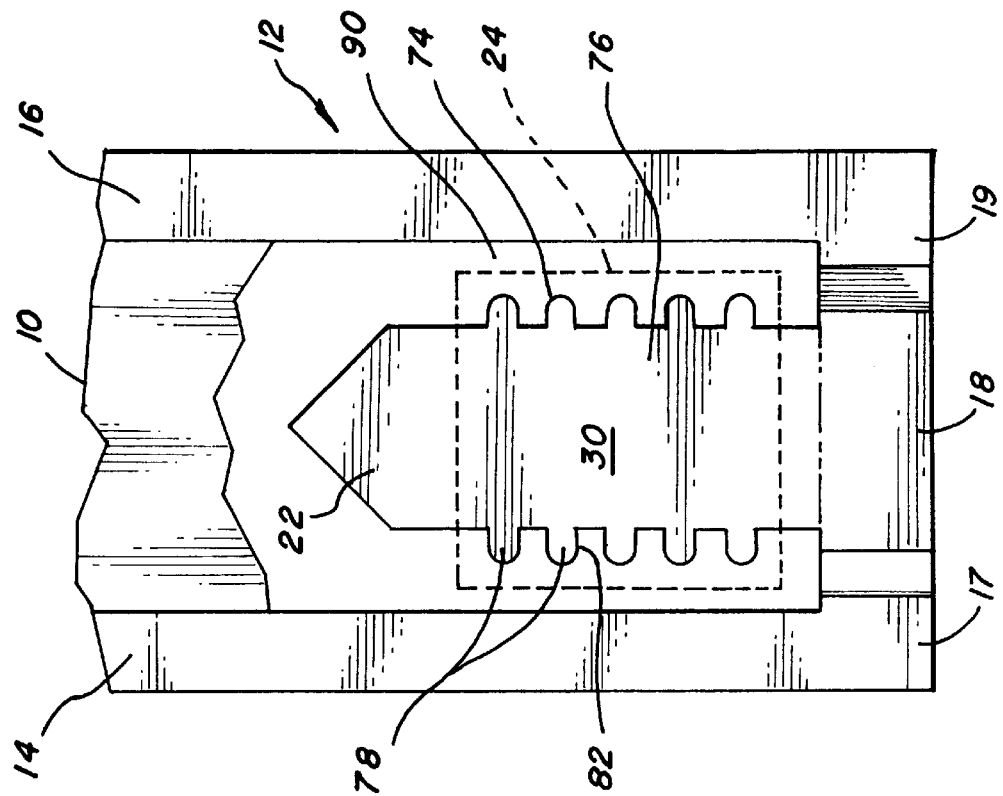

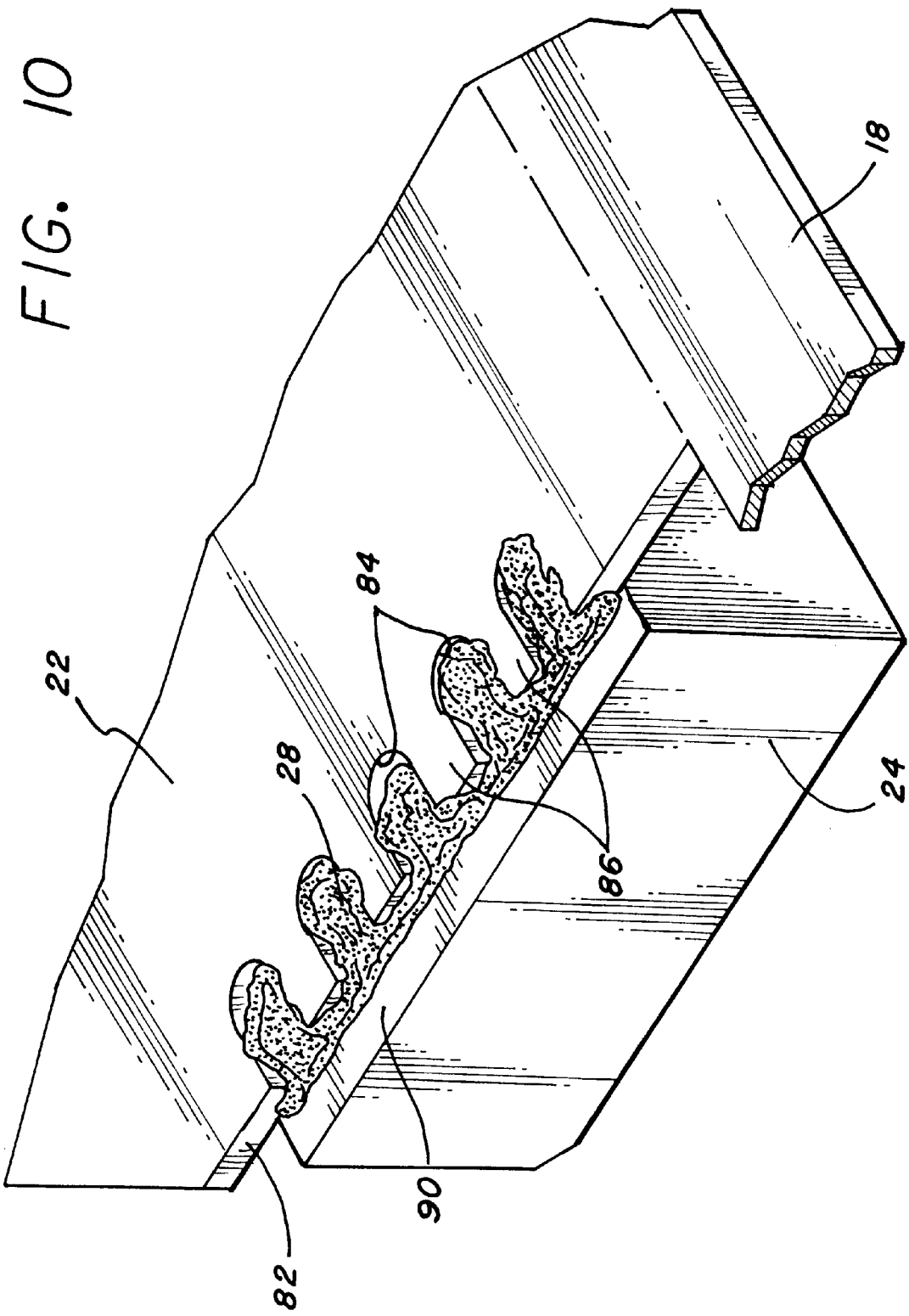

FLEXURE-SLIDER BONDING SYSTEM

RELATED APPLICATIONS

This application claims the benefit of United States provisional Application Serial No. 60/088,684, filed Jun. 9, 1998.

BACKGROUND OF THE INVENTION

1. Field of the Invention

This invention relates to disk drive suspensions, and more particularly, to the bonding of the sliders in such suspensions to the suspension flexure tongues.

2. Related Art

The flexure tongue of a magnetic or magnetic-optical recording head suspensions has as one of its functions providing a surface for bonding attachment of the slider. This surface is generally flat to provide the maximum bonding surface area between the slider and the flexure tongue. In some designs, this surface also includes a dimple to provide a point of contact and a point of rotation between the flexure and the applied load supplied by the load beam. The adhesive bond between the slider and the flexure tongue is required to carry some of the loads applied to the slider by the external environment. These loads include shear, tension, compression, and bending.

Of these loads, three immediately test the adhesive bond. Shear (horizontal) load between the suspension and the slider is due to friction of the disk, acceleration of the slider across tracks during accessing (moving to a new radial location on the disk), and horizontal (in the plane of the disk) shock from movement of the disk drive. The tension load the slider applies to the adhesive bond joint between the slider and the flexure tongue is due to vertical shock, and liftoff, as is the bending load. Tension and shear loads are the most significant.

To achieve an adhesive bond between the slider and the flexure tongue, typically one or more small deposits of fluid, curable adhesive, "dots", are applied to the flexure tongue portion of the suspension before it is moved into contact with the slider in a bonding fixture which holds the assembly in the exact correct position until enough cure of the adhesive has taken place that the assembled slider/suspension combination can be removed from the fixture safely, that is, without relative movement from the correct position. The cure is then continued without fixturing until the cure is complete. The adhesives are chosen for their low outgassing, long pot life, adhesion strength, environmental and safety compatibility, and cost. It is common to have an adhesive that will spot cure under UV light exposure, and then final cure under thermal (oven cure) process.

It is known to use a small hole or holes in the flexure tongue as shown in U.S. Pat. No. 5,008,768 to Carlson, Zarouri and Coon to enhance bond strength by forming a rivet-head like structure so that the adhesive will seep through the hole and form a three dimensional bond instead of a two dimensional bond. Other small holes are used to allow UV light to pass through the load beam and flexure to initiate the cure in some types of UV curing adhesives.

SUMMARY OF THE INVENTION

The requirement for increased bond strength over past requirements stems from the trend toward higher shock loads resistance, i.e. an ability to withstand more "G" forces. The requirement for higher shock load resistance is increasing as more disk drives are being designed for portable/mobile applications.

This requirement cannot be met by increasing the adhesive area, and thus the areal amount of adhesive, for even as higher bond strengths are needed the trend is to smaller and smaller sliders, so the bonding area available is getting smaller.

The decrease in size of suspensions and their components has created another difficulty beyond maintaining or increasing adhesive bond strength. The adhesive must be fluid to apply to the bonding surfaces, but should not extend into areas where its presence will interfere with the clearance between the slider/flexure tongue and other parts of the flexure such as the outrigger area or the load beam. The adhesive must be confined to its proper application area and not be permitted to flow (by drip, capillary, run, or otherwise) beyond its intended locus. Ongoing size reductions in suspension parts increase the difficulty of controlling adhesive placement since the clearance between the different parts of the assembly becomes less. Insufficient or poorly placed adhesive will cause a failure, but excess adhesive may bridge between the flexure tongue or slider, its intended locus, and the flexure outrigger or other part of the assembly causing a failure of a different sort.

Under ideal conditions the bond strength between a slider and flexure tongue will be as high as about 3000 psi. A typical pico or 30% slider provides about 0.002 square inches at most available for bonding. With a 3000-psi adhesive, a slider to flexure tongue bond strength of a maximum of 6 pounds is possible. This is equivalent to several thousand "G"s, and more than sufficient for the applications presently known. Nonetheless, pico slider adhesion sometimes fails, with fatal results to the assembly and a lowering of yields.

It is an object therefore of the present invention to provide improvements in the bonding of slider to flexure tongues. It is a further object to provide more secure bonding through increases in bond adhesive mass, confinement of the adhesive in the proper locus, and texturing of the bonding surface opposite the slider. It is a further object to control the flow paths of the adhesive to prevent bridging between the tongue and flexure outriggers. Still another object is to increase the apparent length of the tongue edges adhered to the slider for additional bonding improvement.

These and other objects of the invention, to become apparent hereinafter are realized in basic form by imposing a partial etch pattern on the bonding side, that is the slider-facing side of the flexure tongue to increase the contact area available for the adhesive by roughening it. The etching also serves to diminish or prevent capillary flow of the adhesive toward areas where it is not desired. The area of the flexure tongue where the dimple force is applied on the far (non-slider) side is not etched or otherwise changed so that the contact area of the dimple is as smooth, flat, and stiff as possible. In addition, in a further embodiment, the perimeter of the flexure tongue is increased with etch-formed fingers such that the adhesive will flow across the fingers for increased adhesion but not flow out from the tongue area to the opposing outriggers.

In particular, the invention provides a disk drive suspension flexure and slider assembly, the flexure comprising an outrigger portion and a tongue portion, the tongue portion having a slider-attaching surface extending in a surface plane, the slider being fluid adhesive-attached to the tongue portion at a predetermined attachment locus on the tongue slider-attaching surface, the slider-attaching surface being surface-etched in surface roughening relation opposite the slider in slowing relation to fluid adhesive flow from the attachment locus.

In this and like embodiments, typically, the etched slider-attaching surface and the slider are substantially coextensive, and the slider-attaching surface is etched below the surface plane to increase the mass of fluid adhesive at the slider and the strength of the adhesive bond.

In a further embodiment, the invention provides a disk drive suspension flexure and slider assembly, the flexure comprising an outrigger portion and a tongue portion, the tongue portion having a slider-attaching surface extending in a surface plane, the slider being fluid adhesive-attached to the tongue portion at a predetermined attachment locus on the tongue slider-attaching surface, the slider-attaching surface being surface-etched below the surface plane opposite the slider and at least partially circumferentially of the attachment locus in trough-forming relation against fluid adhesive flow beyond the trough.

In this and like embodiments, typically: the trough is of uniform depth throughout its length; the trough has a roughened surface for slowing flow of adhesive fluid therethrough; the trough extends fully circumferentially about the attachment locus; the trough defines a repository for the fluid adhesive, whereby the adhesive is locally of a depth greater than the distance between the slider and the surface plane for increased strength in adhering the slider and the attachment surface together; and/or the tongue portion has a perimeter, the tongue portion perimeter being repeatedly reversely deflected for increased perimeter length over a given length of tongue for enhanced adhesion of the fluid adhesive to the tongue portion.

In yet another embodiment, the invention provides a disk drive suspension flexure and slider assembly, the flexure comprising an outrigger portion and a tongue portion, the flexure tongue portion having a slider-attaching surface extending in a surface plane, the slider being fluid adhesive-attached to the tongue portion at a predetermined attachment locus on the tongue portion slider-attaching surface, the attachment locus being surface-etched opposite the slider in fluid adhesive-containing relation.

In this and like embodiments, typically: at least one section of the attachment locus is etched below the surface plane in fluid adhesive receiving relation to increase the depth of adhesive to greater than the distance between the slider and the surface plane; the etched attachment locus section has a roughened surface for slowing flow of fluid adhesive in the section; the etched attachment locus section defines a recess extending normal to the surface plane and adapted to receive and retain fluid adhesive in slider-adhering relation; the recess has in a plane parallel to the surface plane a circular or polygonal shape in cross-section; the recess in a plane parallel to the surface plane is cruciform in shape; and/or the recess in a plane parallel to the surface plane has in cross section the shape of a geometric figure of from three to six sides.

In a further embodiment, the invention provides a disk drive suspension flexure and slider assembly, the flexure comprising an outrigger portion and a tongue portion, the tongue portion having a slider-attaching surface extending in a surface plane, the slider being fluid adhesive-attached to the tongue portion at a predetermined attachment locus on the tongue slider-attaching surface, the slider-attaching surface being surface-etched in recess-defining relation within the attachment locus and surface etched beyond the attachment locus in trough-forming relation against fluid adhesive flow beyond the trough.

In its method aspects, the invention provides the method of assembling a slider and a flexure having an outrigger portion and a tongue portion having a surface opposite the slider and defining an intended attachment locus for the slider, including etching the tongue portion opposite the slider to form a fluid adhesive receptacle, depositing fluid adhesive onto the attachment locus, and containing the fluid adhesive within the etched portion of the tongue portion against contact of the fluid adhesive with the flexure outrigger portion and to increase locally the depth of the adhesive.

In this and like embodiments, typically, there is further included etching the fluid receiving receptacle to a depth below the surface of the tongue portion within the attachment locus to increase locally the depth of the adhesive, etching a roughened surface into the tongue beyond the attachment locus against flowing contact of the fluid adhesive with the flexure outrigger portion, and/or etching a fluid adhesive recess into the tongue inward of the etch-roughened surface and within the attachment locus to increase locally the depth of the adhesive.

BRIEF DESCRIPTION OF THE DRAWINGS

The invention will be further described in connection with the attached drawings in which:

FIG. 3 is a side elevation view thereof;

FIG. 4 is bottom plan view of the bonded tongue and slider in one embodiment;

FIG. 5 is a view like FIG. 4 of a different embodiment of the invention;

FIG. 7A is a view like FIG. 6A of a different embodiment of the invention;

FIG. 7B is a view taken on line 7B in FIG. 7A;

FIG. 7C is a view taken on line 7C in FIG. 7A;

FIG. 8 is bottom plan view of a different embodiment of the invention;

FIG. 9 is a view like FIG. 8 of a different embodiment of the invention;

FIG. 10 is an isometric view of a slider tongue assembly in which the tongue has a reversely deflected perimeter edge.

DETAILED DESCRIPTION

Figure 1:
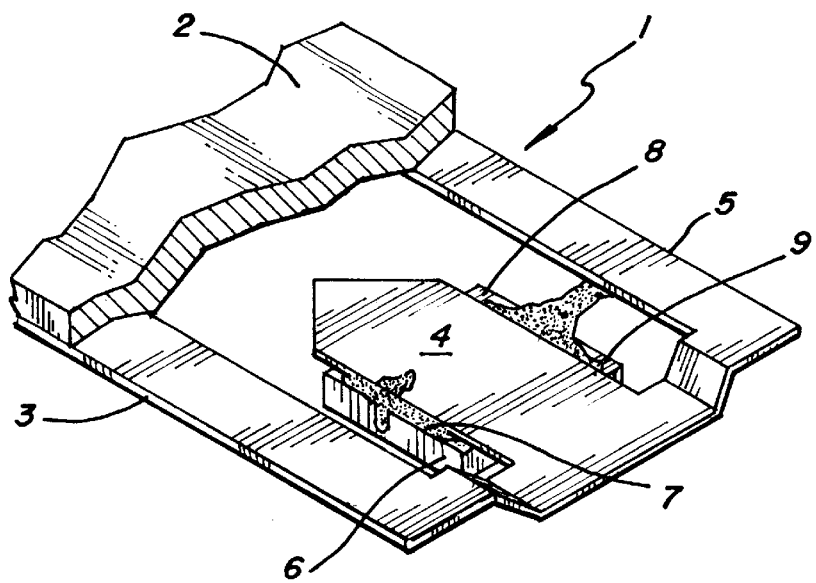
FIG. 1 is a PRIOR ART Figure showing a bonded slider and tongue in which the adhesive is bridging the gap between the tongue and the outrigger portion of the flexure.

With reference now to the drawings in detail, In FIG. 1 the PRIOR ART suspension assembly 1 comprises a load beam 2, a flexure 3 carried by the load beam, a flexure tongue 4 cantilevered from the outrigger portion 5 of the load beam. A slider 6 is glued to the flexure tongue 4 by adhesive 7. The adhesive is shown somewhat exaggeratedly as overflowing the intended gluing area 8 and entering he gap 9 between the tongue 4 and the outrider portion 5. This bridging of the adhesive will interfere with the proper operation of the suspension. The adhesive area may be adequate if the thickness of adhesive is sufficient, but the present invention improves on the mass or adhesive 7 used for bonding by etching the smooth tongue surface opposite the slider 6 and provides means of capturing the adhesive in its proper place.

Figure 2:
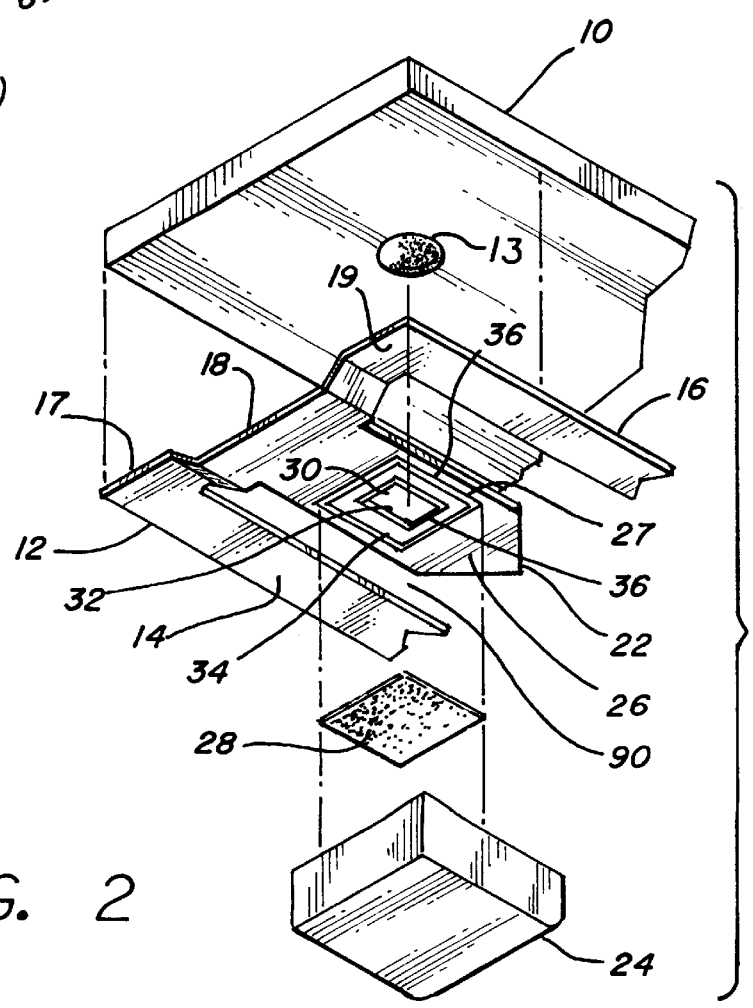
FIG. 2 is an exploded view of a flexure tongue and slider combination according to the invention.

In FIGS. 2 and 3, the disk drive suspension comprises the load beam 10 and the flexure 12 fastened to the load beam generally opposite the dimple 13. The flexure 12 comprises outrigger portions 14, 16 joined at their distal ends 17, 19 to vertically offset flexure terminal portion 18 and a central flexure tongue portion 22 cantilevered from the flexure terminal portion to extend between the vertical planes of the outrigger portions of the flexure. Slider 24 containing the magnetic or magneto-optical head (not shown) is fixed to the surface 26 of the flexure tongue portion. A mass of adhesive 28 shown representationially as a solid flat mass but actually applied as a fluid mass, fixes the slider 24 to the tongue portion surface 26.

The tongue portion surface 26 is modified as shown in FIG. 2, and in subsequent Figures to be described, by defining at the proposed locus 30 of slider attachment one or more adhesive flow control elements including inner rectangular trough 32, outer rectangular trough 34, each generally circumferentially distributed about the attachment locus 30, and etched surfaces 36 in these troughs or elsewhere on the tongue surface 26 which act to slow adhesive flow through the troughs or across the tongue surface.

In FIGS. 4 and 5, the size relationship of the slider 24 to the adhesive mass 28 is depicted. In general both the size of the slider 24 and the adhesive locus are variable to accommodate different design requirement. There may be excess width or excess length of slider or both in a given assembly of a slider and tongue, but every assembly will have an overlapping area, an area of registration between the slider 24 and the opposing surface 26 of the tongue portion 22, which area usually less a perimetrical margin 27 is termed the attachment locus 30 herein. Thus, in FIG. 4, the tongue portion 22 defines an attachment locus 30 which is central to the tongue portion and central to the slider 24, with the slider profile extending laterally of the locus on either side and longitudinally thereof in both front and rear. Within the attachment locus 30 an area is crosshatched to represent the adhesive mass 28 which is generally coincident with a surface-etched portion of the tongue 22. The etching is carried out in the manner of etching load beams generally in the art by applying a suitable etchant to an unmasked surface portion corresponding to the locus 30 and etching until there is a surface roughening tangible to the touch and visible but not necessarily to any measurable depth into the surface 26. This level of surface roughening is sufficient to limit the rate of flow of the fluid adhesive across the surface 26 in the etched areas, and serves to limit out-of-bounds flow of the adhesive, concentrating the adhesive mass 28 in the intended area FIG. 5 shows a different profile relationship between the slider, the attachment locus 30 and the adhesive mass 28. There the adhesive mass 28 extends beyond the distal end 38 of the slider 24. This arrangement will produce a fillet 42 at tg distal end that improves the bonding of the slides 24 to the surface 26 and moderately increases the amount of adhesive mass 28.

Figure 6B:
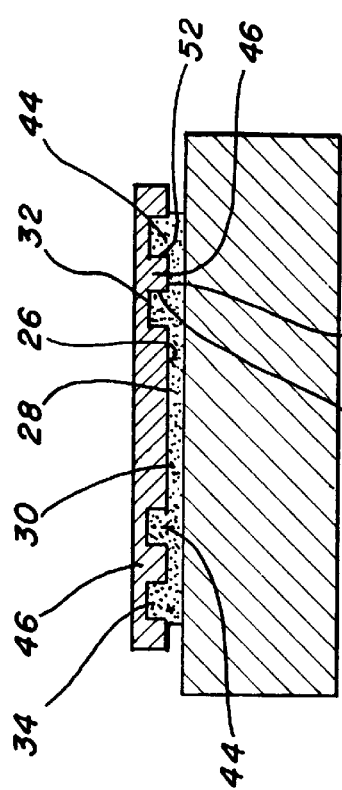
FIG. 6B is a view taken on line 6B in FIG. 6A.
Figure 6C:
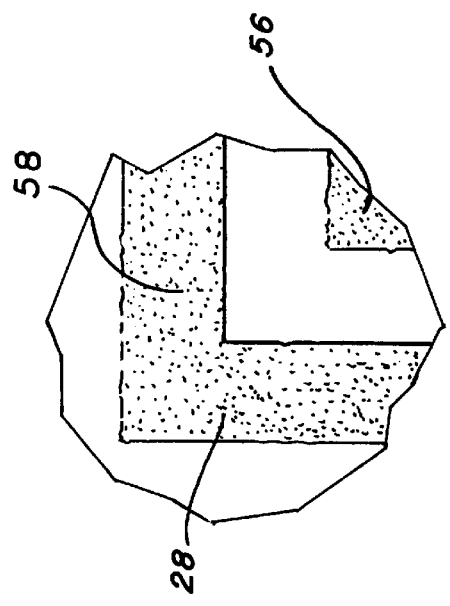
FIG. 6C is a view taken on line 6C in FIG. 6A.
Figure 6A:
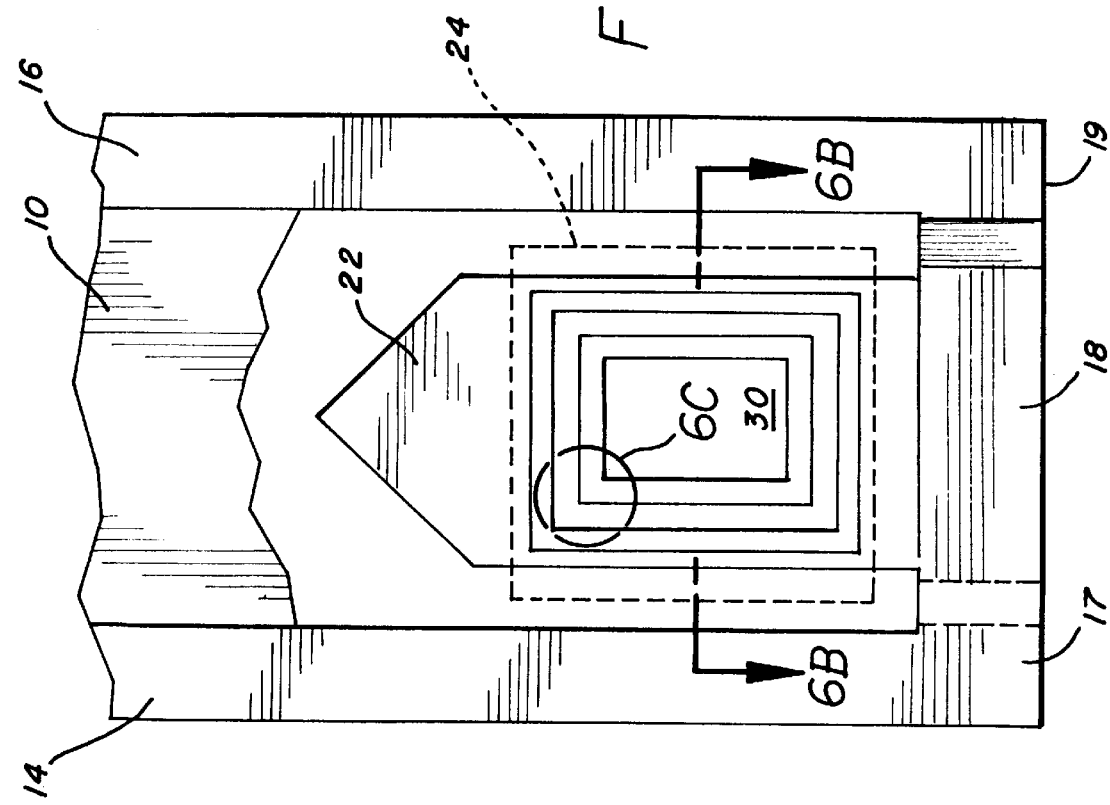
FIG. 6A is a view like FIG. 4 of a different embodiment of the invention.

In FIGS. 6A, 6B and 6C the use of combined troughs and surface roughening is shown. Load beam 10 supports flexure 12 by its outrigger portions 14, 16. Flexure tongue portion 22 is cantilevered from the flexure distal end 18 as in the previous embodiments. Tongue portion surface 26 is etched to define generally opposite the slider 24, and within the attachment locus 30 a series of congruent, closed-figure. rectangular troughs including inner trough 32 and outer tough 34. Troughs 32, 34, serve to trap and limit outward adhesive flow so as to slow such flow and to contain any excess amount beyond that desired in the bonding process. The width of each or both of the troughs 32, 34 or similar additional troughs (not shown) is not narrowly critical and will be such that etch-formation of the trough is feasible, and the fluid adhesive being used will flow ilto the trough and remain therein. The depth of the troughs 32, 34 is not narrowly critical either and will be such that etch-formation is feasible, and the fluid adhesive being used will flow into and be retained therein. A uniform width and depth of trough will be usefull in forming a rib 44 of adhesive of suitable cross-section, and more readily gauging the amount adhesive mass provided and is preferred herein. The spacing of the inner rough 32 from the outer trough 34 defines the tongue portion rib 46 whose sides 48, 52 and top face 54 lend bonding area and greater bond strength. See FIG. 6B. The configuration of tongue portion rib 46 is not narrowly critical and will be selected to maximally increase bonding of the slider 24 to the tongue portion 22 without substantial adverse effect elsewhere in the system. As previously noted, it is preferred to maintain in the troughs 32, 34 a roughened surface 56, 58 such as above described as being obtained for the etching process to promote adhesion of the cured adhesive, and to control the rate of flow of the uncured, fluid adhesive in forming the adhesive mass 28 so as to fill the troughs but not more with adhesive. See FIG. 6C.

FIGS. 7A, 7B and 7C in which like parts have like numerals to FIGS. 1–6, the tongue portion 22 is provided, by etching, with an illustrative variety of trough configurations, including in cross section in a plane parallel to the tongue portion surface 26 circular shape troughs 62, and polygonal shaped troughs 64, 66, cruciform shaped troughs 68, and combinations of these figures such as a ribbed trough 72. In each instance, the individual width and depth dimension, the pattern of shape, the proximity of one shape to another all can be varied to provide not only anchors for the fluid adhesive when cured but flow control through the reception of the flowing adhesive in one or more troughs. Sec FIG. 7b and C. As in the FIG. 6 embodiment, the trough bottom 73 and side walls 75 too if desired are roughened during the etching process for increased adhesion and increased resistance to flow of fluid adhesive.

FIGS. 8 and 9 illustrate a further feature of the invention. In FIG. 8 the perimeter 74 of the tongue portion 76 is repeatedly reversely deflected to form fingers 78 which increase greatly the perimeter edge 82 and thus the bonding surface available and the level of bonding strength obtain. The fingers 78 are formed by etching and can be surface-etched. In FIG. 9 the tongue portion 22 is again repeatedly reversely deflected, this time to form inlets 84 between peninsulas 86 with the same effect of increasing the length of the tongue portion perimeter 82 and affording better bonding. See FIG. 10 where the pattern of fluid adhesive distribution in, on and around the inlets 84 and peninsulas 86 is depicted. The adhesive mass 28 tends to incorporate the tongue portion edge in the mass and thus a stronger bond is formed.

The several described treatments of the tongue portion 22 all tend to limit the flow of fluid adhesive, and positively prevent adhesive flow across the gap 90, and resultant interference of the adhesive with the proper operation of the flexure.

The invention thus provides improvements in the bonding of slider to flexure tongues, affording more secure bonding through increases in bond adhesive mass, confinement of the adhesive in the proper locus, and texturing of the bonding surface opposite the slider. Moreover, the invention controls the flow paths of the adhesive to prevent bridging between the tongue and flexure outriggers, and increases the apparent length of the tongue edges adhered to the slider for additional bonding improvement. The foregoing objects are thus met.

I claim:

1. A disk drive suspension flexure and slider assembly, said flexure comprising an outrigger portion and a tongue portion, said tongue portion having a slider-attaching surface extending in a surface plane, said slider being fluid adhesive-attached to said tongue portion at a predetermined attachment locus on said tongue slider-attaching surface, said slider-attaching surface being surface-etched to form a recess below said surface plane to increase the mass of fluid adhesive at the slider and the strength of the adhesive bond, said recess being etched in surface roughening relation opposite said slider so as to slow the fluid adhesive flow from said attachment locus, said tongue portion having a perimeter that is repeatedly reversely deflected for increased perimeter length over a given length of tongue for enhanced adhesion of said fluid adhesive to said tongue portion.

2. The disk drive suspension flexure and slide assembly according to claim 1, in which said etched slider-attaching surface and said slider are substantially coextensive.

3. A disk drive suspension flexure and slider assembly, said flexure comprising an outrigger portion and a tongue portion, said tongue portion having a slider-attaching surface extending in a surface plane, said slider being fluid adhesive-attached to said tongue portion at a predetermined attachment locus on said tongue slider-attaching surface, said slider-attaching surface being surface-etched below said surface plane opposite said slider and at least partially circumferentially of said attachment locus in trough-forming relation against fluid adhesive flow beyond said trough, said trough extending fully circumferentially about said attachment locus, said trough being etched to have a roughened surface for slowing the flow of adhesive therethrough.

4. The disk drive suspension flexure and slider assembly according to claim 3, in which said trough is of uniform depth throughout its length.

5. The disk drive suspension flexure and slider assembly according to claim 3, in which said trough defines a repository for said fluid adhesive, whereby said adhesive is locally of a depth greater than the distance between said slider and said surface plane for increased strength in adhering said slider and said attachment surface together.

6. A disk drive suspension flexure and slider assembly, said flexure comprising an outrigger portion and a tongue portion, said flexure tongue portion having a slider-attaching surface extending in a surface plane, said slider being fluid adhesive-attached to said tongue portion at a predetermined attachment locus on said tongue portion slider-attaching surface, said attachment locus being surface etched beneath said slider in fluid adhesive-containing relation, at least one section of said attachment locus being etched below said surface plane in fluid adhesive receiving relation to increase the depth of adhesive to greater than the distance between said slider and said surface plane, said etched attachment locus section being etched to have a surface roughness tangible to the touch and visible for slowing flow of fluid adhesive in said section and beyond said section.

7. The disk drive suspension flexure and slider assembly according to claim 6, in which said recess in the plane parallel to said surface plane is cruciform in shape.

8. The disk drive suspension flexure and slider assembly according to claim 6, In which said recess in the plane parallel to said surface plane has in cross section the shape of a geometric figure of from three to six sides.

9. The disk drive suspension flexure and slider assembly according to claim 6, in which said tongue portion has a perimeter, said tongue portion perimeter being repeatedly reversely deflected for increased perimeter length over a given length of the tongue portion for enhanced adhesion of said fluid adhesive to said tongue portion.

10. The method of assembling a slider and a flexure having an outrigger portion and a tongue portion having a surface opposite said slider and defining an intended attachment locus for said slider, including etching said tongue portion beneath said slider to a depth below the surface of said tongue portion within said attachment locus to increase locally the depth of said adhesive, depositing fluid adhesive onto said attachment locus, etching a roughened surface into said tongue beyond said attachment locus against flowing contact of said fluid adhesive with said flexure outrigger portion, and containing said fluid adhesive within said etched portion of said tongue portion against contact of said fluid adhesive with said flexure outrigger portion.

* * * * *